United States Patent

[11] 3,617,549

[72] Inventor Edward Robbart
 321 Fairmount Ave., Milton, Mass. 02186
[21] Appl. No. 838,054
[22] Filed June 27, 1969
[45] Patented Nov. 2, 1971
 Continuation of application Ser. No.
 621,083, Dec. 12, 1966, now abandoned,
 Continuation-in-part of application Ser. No.
 310,537, Sept. 23, 1963, now abandoned.

[54] SEPARATION OF DISSOLVED SUBSTANCES FROM SOLUTIONS THEREOF
 5 Claims, 1 Drawing Fig.
[52] U.S. Cl. .................................................. 210/23,
 210/321, 210/500
[51] Int. Cl. ...................................................... B01d 13/00
[50] Field of Search ........................................... 210/22, 23,
 321, 500

[56] References Cited
 UNITED STATES PATENTS
 3,133,132 5/1964 Lueb et al. ..................... 264/41
 OTHER REFERENCES
Sourirajan, " The Mechanism of Demineralization of Aqueous Sodium Chloride Solutions by Flow, Underpressure, Through Porous Membranes" from Industrial and Engineering Chemistry Fundamentals, Vol. 2, No. 1, 80 pp. pages 51-55 relied on, Received in Patent Office 2-4-63 (copy in Scientific Library).

Primary Examiner—Frank A. Spear, Jr.
Attorney—Kenway, Jenney, Hildreth, Kenway, Bertelsen, Lynch, Crowley, Lyon, Horn, Jr., Gunn & Lahive, Jr.

ABSTRACT: Apparatus for removing dissolved substances from solution consists of a porous body having a solution-repellent surface of e.g., a silicone of fluorocarbon, through which the solution is forced under pressure. A characteristic of the porous body is that it is more resistant to flow through it of the solution than to the flow through it of the pure solvent. Processes effecting the separation of salt and $D_2O$ from their aqueous solutions are described.

PATENTED NOV 2 1971 3,617,549
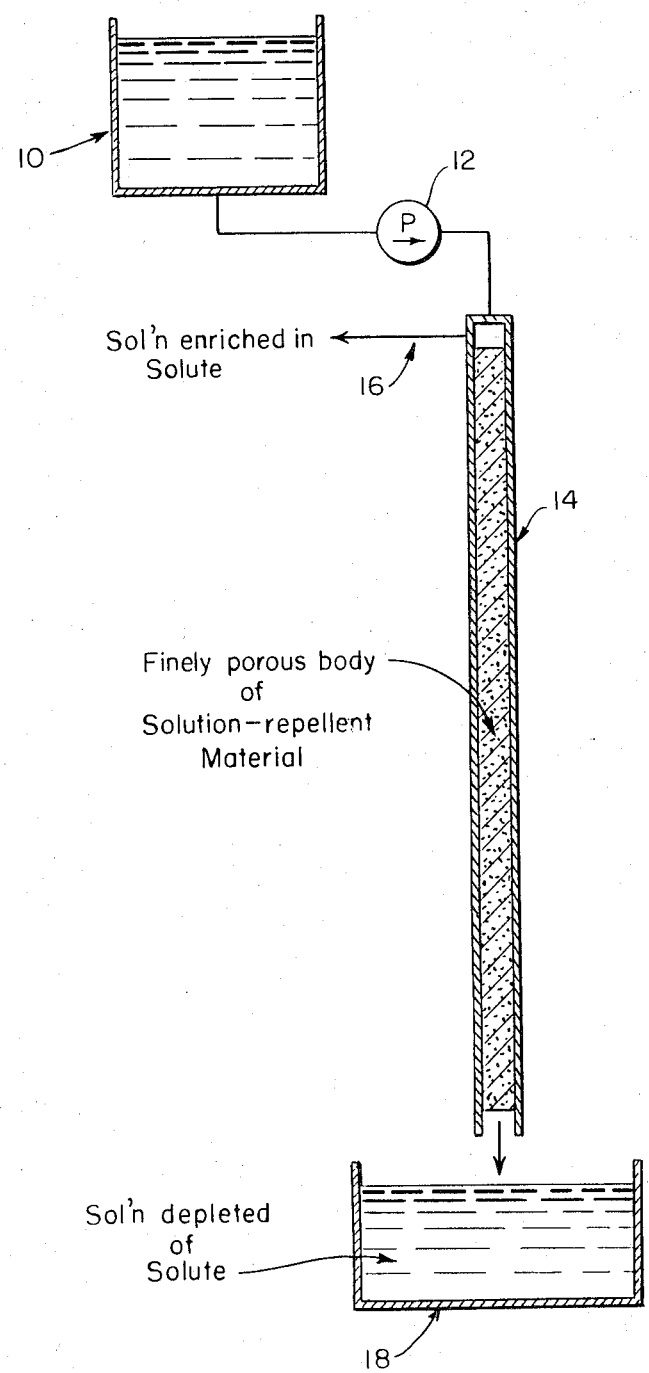

SEPARATION OF DISSOLVED SUBSTANCES FROM SOLUTIONS THEREOF

This application is a continuation of my application Ser. No. 621,083 filed Dec. 12, 1966, which in turn was a continuation-in-part of my application Ser. No. 310,537, filed Sept. 23, 1963 for Separation of Dissolved Substances From Solutions Thereof, both now abandoned.

My invention relates to the removal of dissolved substances from solutions and provides a novel process and apparatus therefor.

Numerous well-known techniques are available for separating solutions into their constituent solute and solvent components, in which either the solvent is removed from the solute, as by evaporation and freezing techniques, or by removing the solute from the solvent as by dialysis and electrodialysis. In all of these the energy necessary for separation is supplied as heat, electricity, or through the maintenance of a concentration differential.

It has perhaps been conceived in the abstract that dissolved matter may be removed mechanically from solution, in the nature of a filtration process through a porous bed, but no such process has ever been developed and would moreover be contrary to the prevailing concept of the nature of a true solution. It is known however that large particles such as colloids, may be removed by mechanical means, and in the popular sense a suspension of such colloidal material is sometimes referred to as a solution. Such illustration techniques are not however effective for separating a solute from a true solution.

Reverse osmosis techniques have also been described. These appear to involve a phenomenon occuring at the interface between a mass of water and a membrane, wherein the interface film appears to be relatively enriched in water and relatively depleted in solute. Others have suggested that reverse osmosis involves preferential absorption and subsequent diffusion of water.

The present invention deals with the separation of solutes from true solutions and is based on the discovery that if a solution is forced through a body of extremely fine porous material which is repellent to the solution, solute will be concentrated and concentrate at the inlet end, while the solution will be correspondingly depleted of solute at the outward end.

The following examples demonstrate the nature of my discovery.

EXAMPLE 1

Salt was removed from sea water by passing the sea water through a column packed with sand treated to render the particles water repellent.

The sand was a sample collected on the beach at Ipswich, Massachusetts, having a screen analysis as follows:

Percent Retained

| | |
|---|---|
| 20 mesh | 0 |
| 40 mesh | 22.4 |
| 60 mesh | 43.76 |
| 80 mesh | 26.46 |
| 150 mesh | 7.37 |
| Through 150 mesh | 0 |

The sand was washed and dried and then immersed in a mixture of methyl chloro silane consisting of 50 percent methyl trichloro silane, 30 percent dimethyl dichloro silane, and 20 percent methyl dichloro silane. The sand and silane mixtures were mixed well together and then baked in an oven at 220°–230° F. to remove the excess silane. The sand was then washed in water and dried, at which point a distinctive water-repellent characteristic was observed.

The sand was packed in a 5-foot length of a ⅜-inch extra strong stainless steel pipe, on a retaining bed of perforated steel plug and 200-mesh screen. Sea water was then pumped through the pipe under a pressure of 5,000 p.p.s.i. After operations had gotten underway, an analysis of the effluent was made, and it was determined that the chloride content was reduced by passage through the pipe from an initial concentration of 1.76 percent to a final concentration of 1.73 percent. After operations were concluded, a noticeable deposit of white crystalline material was observed at the inlet end of the bed of sand.

EXAMPLE 2

Sand prepared as described in example 1 after being washed and dried following the silane treatment was mixed with an equal part by volume of a phenyl methyl silicone resin (General Electric S1–98) containing about 50 percent solvent. A 6-inch length of ⅜-inch extra strong stainless steel pipe was filled with the same resin then drained to impart a coating to the inside, and was then baked for one-half hour at 80° C. followed by 1½ hours at 155° C. followed by 2 hours at 250° C. After the tube was cooled, the sand and resin mix was packed into it and the same curing cycle was repeated.

The packed tube was connected by a pipe to a pump, and a solution of sodium chloride in water was forced through it under a pressure differential of 500 pounds per square inch. Passage through the tube resulted in a chloride reduction from 1.78 percent to 1.75 percent, and following the operation, after the tube was dried, a deposit of crystalline material was found deposited at the inlet end of the tube but not at the outlet end.

EXAMPLE 3

A packed pipe of sand prepared as described in example 2 was connected to a pump. Pure water was forced through the packed pipe under a pressure of 100 pounds per square inch, and a flow rate of 18 milliliters per minute was observed. Next, a solution of water containing 5000 p.p.m. of sodium chloride was forced through the packed pipe under a pressure differential of 100 pounds per square inch, and a flow rate of 11 milliliters per minute was observed. Samples collected above and below the packing were analyzed. It was found that above the packing, the salt concentration was 5,445 p.p.m., while below the packing the concentration was 4,950 p.p.m.

EXAMPLE 4

Water containing 10 percent by weight of $D_2O$ was forced through a packed pipe prepared as described in example 2. A pycnometer was charged with a sample of the unfiltered solution and found to weigh 18.7630 grams. A pycnometer sample of the filtered effluent weighed 18.7528 grams, indicating a corresponding extraction of the $D_2O$ from $H_2O$.

The foregoing examples demonstrate an entirely novel principle by which filtration through a finely porous bed of material repellent to the solution being treated is effective to cause the removal of solute from the solution. In each case the bed was sufficiently finely porous that the solution would not flow through it except under high pressure, apparently because of the repellent nature of the walls of the pores which resisted wetting by the solution.

In carrying out the process of this invention, it appears that an essential criterion of the mass of porous material through which the solution is passed be that the surface of the material be repellent to the solution. It is here contemplated that the solution exhibit no substantial wetting characteristics for the surface as would be shown if a capillary, having the same surface, would not permit the solution to rise to its own height. Alternatively, a repellent surface would not be wet by the solution, but would rather cause the solution to accumulate in globules. In the foregoing examples, sand is treated with an organo halogeno silane, forming on the surface thereof a polysiloxane in the manner described by Patnode, U.S. Pat No. 2,306,222. As the solutions in these examples are aqueous, the siloxane surface coating on the particles provides an ideally repellent surface.

Other methods of rendering the packing water-repellent can be employed. For example, a satisfactory packing can be prepared from sand and a commercial Teflon (polytetrafluorethylene) aerosol solution. The liquid Teflon solution is collected in a beaker, and mixed with sand to form a paste. The paste is packed in a suitable pipe as described above, and baked until the packing is dry.

A characteristic of the porous mass that has been observed may assist in an understanding of the mechanism of this invention. A mass of porous material, such as a fritted glass disc permits the flow of water through it under a given pressure at a given rate per unit time/per unit area. If a salt be dissolved in the water, the rate of flow is increased. If now this same mass be treated to render it water-repellent, as by contact with an organo halogeno silane, the rate of flow of water through it under the same pressure is much less; and if an electrolyte be dissolved in the water, whereby a partial separation in accordance with the principles of this invention occurs, the rate of flow under the same pressure is reduced even further. Thus, whereas the presence of salt resulted in an increased rate of flow when the solution is passed through a nonwater-repellent bed, it results in a reduced rate of flow when the porous bed is repellent to the solution.

A continuous process for carrying out a separation in accordance with this invention is shown schematically in the drawing In that system a solution in the supply reservoir 10 is forced by a pump 12 into the upper end of a column 14, in which is contained a porous mass of material repellent to the solution prepared as described above. A tap is provided at the upper of the column to bleed off a small fraction, e.g., 10 percent, of the solution at the top of the column, while the balance of solution is collected in a reservoir 18 at the bottom of the column.

In an actual operation employing a column as described in example 2, a solution of sodium chloride having an original concentration of 29,824 p.p.m., was forced under a pressure of about 500 p.s.i. through the column while 50 percent was bled off at the top. This was found by analysis to have been enriched to a concentration of 30,005 p.p.m., while the balance of solution passing through the column and collected in the reservoir 18, was found by analysis to have been depleted of solute to a concentration of 29,345 p.p.m.

I am unable to account for the basic mechanism of this operation, but visualize that any one of several mechanisms may play a part. It may be that the porous mass retains the liquid and prevents its passage except for molecules that escape from the liquid and move on through in the nature of particles escaping from the surface of the liquid during evaporation. It may also be that the particles of solute enter a complex with the solvent which is larger than the molecules of solvent themselves, thus providing a basis for mechanical separation by a filtering action. These thoughts are advanced by way of hypothesis only and should not be taken in any way as an explanation of or definition of this invention.

It is contemplated that the process herein described will be applicable to many types of solutions as may be readily determined by routine experimentation which does not amount to invention, and also that numerous types of porous bodies may be readily formulated on the basis of this disclosure together with the known nature of materials and the affinity of the various types of liquids to various types of solids. It is accordingly contemplated that numerous modifications of the process herein described will occur to those skilled in the art, and that they may be made without departing from the scope of this invention.

Having thus described my invention, I claim and desire to secure by Letters Patent:

1. The method of removing dissolved substances from a solution thereof which comprises passing said solution through a finely porous packed bed of particles of material having surfaces throughout said bed forming the walls of the pores therein characterized by being repellent to said solution such that said bed is more resistant to flow through the bed of the solution than to flow through it of the pure solvent of said solution, thereby enriching the solution at the upstream end of said body in said substance and depleting the solution at the downstream end of said body in said substance.

2. The method defined by claim 1, further characterized by removing a fraction of said solution from the upstream end of said body and removing a depleted fraction of said solution from the downstream end of said body.

3. The method defined by claim 1, wherein the finely porous beds composed of particles having pore surfaces of an organo polysiloxane or poly tetrafluoroethylene.

4. The method defined by claim 3, further characterized by removing a fraction of said solution from the upstream end of said body.

5. Apparatus for removing dissolved substances from a solution thereof comprising a fluid permeable finely porous packed bed of particles of material having a water repellent surface throughout said bed and forming the walls of the pores therein, characterized that the resistance the flow through said bed of an aqueous solution of salt is greater than that of pure water, a container housing said mass and means for introducing solution to be treated into said container at one side of said mass under pressure sufficient to force said solution throughout said mass.

* * * * *